United States Patent
Zukunft et al.

(10) Patent No.: US 9,819,430 B2
(45) Date of Patent: Nov. 14, 2017

(54) SELECTIVE CHANNEL ESTIMATION

(71) Applicant: Lantiq Beteiligungs-GmbH & Co.KG, Neubiberg (DE)

(72) Inventors: Roland Zukunft, Neubiberg (DE); Pidder Kassel, Oberhaching (DE); Stefan Krause, Munich (DE)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 0 days.

(21) Appl. No.: 15/143,659

(22) Filed: May 2, 2016

(65) Prior Publication Data

US 2016/0329978 A1 Nov. 10, 2016

(30) Foreign Application Priority Data

May 8, 2015 (EP) ..................... 15166970

(51) Int. Cl.
| | |
|---|---|
| *H04M 1/24* | (2006.01) |
| *H04M 3/08* | (2006.01) |
| *H04M 3/22* | (2006.01) |
| *H04J 1/12* | (2006.01) |
| *H04B 3/32* | (2006.01) |
| *H04L 25/02* | (2006.01) |
| *H04L 1/00* | (2006.01) |
| *H04L 7/00* | (2006.01) |
| *H04M 3/34* | (2006.01) |

(52) U.S. Cl.
CPC .................. *H04J 1/12* (2013.01); *H04B 3/32* (2013.01); *H04L 1/0054* (2013.01); *H04L 7/0054* (2013.01); *H04L 25/0204* (2013.01); *H04L 25/0228* (2013.01); *H04M 3/34* (2013.01)

(58) Field of Classification Search
USPC ................................ 379/1.03, 1.04
See application file for complete search history.

(56) References Cited

U.S. PATENT DOCUMENTS

| | | | |
|---|---|---|---|
| 6,628,722 | B1 | 9/2003 | Laroia et al. |
| 6,804,267 | B1 | 10/2004 | Long et al. |
| 8,045,606 | B2 | 10/2011 | Oh et al. |
| 8,923,487 | B2 | 12/2014 | Alloin et al. |
| 9,667,450 | B2 | 5/2017 | Ashikhmin et al. |
| 2006/0050774 | A1 | 3/2006 | De Marchi |
| 2008/0187077 | A1* | 8/2008 | Matza .................... H04B 3/487 375/347 |

(Continued)

FOREIGN PATENT DOCUMENTS

| | | |
|---|---|---|
| EP | 2835911 A1 | 2/2015 |
| EP | 2858255 A1 | 4/2015 |

OTHER PUBLICATIONS

Extended European Search Report of prior application EP 15 166 970.2 dated Oct. 20, 2015.

*Primary Examiner* — Quoc D Tran
(74) *Attorney, Agent, or Firm* — Eschweiler & Potashniks, LLC

(57) ABSTRACT

A sequence of symbols is received on a first channel. A noise contribution of a given synchronization symbol is estimated; a reference noise contribution of at least one further symbol is estimated. Based on the noise contribution and further based on the reference noise contribution the given synchronization symbol is selectively considered when determining a coupling coefficient of crosstalk between the first channel and a second channel.

20 Claims, 3 Drawing Sheets

(56) References Cited

U.S. PATENT DOCUMENTS

| | | |
|---|---|---|
| 2009/0067614 A1 | 3/2009 | Washburn et al. |
| 2009/0175156 A1* | 7/2009 | Xu .......................... H04B 3/32 370/201 |
| 2011/0007788 A1 | 1/2011 | Cendrillon et al. |
| 2011/0206104 A1 | 8/2011 | Wiese |
| 2012/0106605 A1 | 5/2012 | Ashikhmin et al. |
| 2012/0163491 A1 | 6/2012 | Clausen et al. |
| 2013/0107917 A1 | 5/2013 | Gupta |
| 2013/0294597 A1 | 11/2013 | Shi et al. |
| 2014/0119419 A1* | 5/2014 | Strobel .................. H04B 3/32 375/224 |
| 2016/0087677 A1 | 3/2016 | Strobel et al. |

* cited by examiner

SELECTIVE CHANNEL ESTIMATION

TECHNICAL FIELD

According to various embodiments, a synchronization symbol of a sequence of symbols is selectively taken into account when determining a coupling coefficient of crosstalk between two channels, depending on a noise contribution of the given synchronization symbol and a reference noise contribution of at least one further symbol. In particular, various embodiments relate to performing channel estimation in vectored communication systems in a selective manner by taking into account a reliability value of a synchronization symbol.

REFERENCE TO RELATED APPLICATIONS

This application claims priority benefit of European Patent Application 15 166 970.2 filed on May 8, 2015. The entire content of the indicated prior application is hereby incorporated by reference herein.

BACKGROUND

Digital Subscriber Line (DSL) technology, including e.g. ADSL, ADSL2, (S)HDSL, VDSL, VDSL2 up to the upcoming G.fast, during all its history, attempted to increase the bit rate in the aim to deliver more broadband services to the customer. Unfortunately, copper loops deployed from a Central Office (CO) to customer premises (CPE) are rather long and do not allow transmission of data with bit rates more than few Mb/s. Therefore, to increase the customer available bit rates, modern access networks use street cabinets, MDU-cabinets, and similar arrangements, also referred to as distribution points (DP): the cabinet or other DP is connected to the CO by a high-speed fiber communication line, e.g., gigabit passive optical network (GPON) and installed close to the customer premises. From these cabinets, high-speed DSL systems, such as Very-High-Bit-Rate DSL (VDSL), provide connection to the CPE. The currently deployed VDSL systems (ITU-T Recommendation G.993.2) have range of about 1 km, providing bit rates in the range of tens of Mb/s. To increase the bit rate of VDSL systems deployed from the cabinet, the recent ITU-T Recommendation G.993.5 defined vectored transmission that allows increasing upstream and downstream bit rates up to 100 Mb/s and more. Vectoring will also be used in upcoming G.fast.

One important component or stage of DSL systems is initialization (or training). During the initialization, channels that join to the vectored group provide the ability for existing active channels to accommodate crosstalk from new channels, provide the ability for joining channels to accommodate crosstalk from active channels and other joining channels, and finally provides joining channels with proper transmit power and bit loading.

This application addresses, amongst others, initialization and adaptation of vectored channels. One serious issue with vectored channels is high crosstalk, especially when very high frequencies (such as 5 MHz and higher) are used. During initialization and training, when FEXT (far-end crosstalk) between channels established on lines of a cable binder comprising a plurality of lines is not reduced or cancelled, signals transmitted over channels are "visible" in all other channels. FEXT can be the dominant disturber of data transmission. Generally, it is possible to cancel FEXT at the CO-side by vectoring.

Typically, in downstream direction, FEXT can be cancelled by pre-coding transmit signals sent on the channel. In upstream direction, FEXT can be cancelled by post-processing signals received on the channels. In both cases, typically, the vectoring processor (VP) needs to have access to the signals of all channels in the cable binder. Cancellation is usually done in frequency domain by weighting transmit and receive symbols of all channels by a so-called cancellation matrix in downstream direction and upstream direction, respectively. The cancellation matrix thus describes the FEXT between any two channels of lines of a cable binder.

The cancellation matrix can be calculated, e.g., during initialization, by means of parameters obtained from channel estimation. Generally, it is possible that the VP either estimates the channels directly and calculates the cancellation matrix based on the channel estimation, or uses values provided by the central office and the CPE in order to calculate or adapt the cancellation matrix. Usually, the crosstalk parameters are adapted after initialization has finished during Showtime, e.g., by means of an adaptive algorithm. Then, the cancellation matrix is updated/adapted accordingly.

Usually, for channel estimation synchronization symbols are included in a stream or sequence of symbols transmitted via the channel. Sometimes, a situation may occur where one or more synchronization symbol are significantly affected by non-FEXT noise present on the channel, e.g., background noise or impulse noise. If, in such a scenario, a synchronization symbol is used to determine/adapt the cancellation matrix, this may result in a reduced accuracy of FEXT reduction. In particular, impulse noise present on the channel may have a significant impact on the accuracy with which the cancellation matrix is determined.

To address this issue to some degree, it is known to provide a so-called reliability bit in a message that is used by the CPE to report the error vector, see ITU-T Rec. G.993.5, Section 7.2.3.1. The reliability bit seeks to indicate whether the reported error values are reliable or not. However, the usage of such the reliability bit may be inaccurate and it may be questionable whether the reliability bit has been determined accurately. Also, generation of the reliability bit resides within the duty of the CPE which can increase control signalling and increase inaccuracies in determining the reliability bit.

It is also known to estimate impose noise based on reported error of feedback values, see US 2012/0106605 A1. However, also such approaches are comparably sensitive to background noise, in particular impulse noise.

SUMMARY

According to an aspect, a device is provided. The device comprises an interface configured to receive, on a first channel, a sequence of symbols. The device further comprises at least one processor configured to estimate a noise contribution of the given synchronization symbol of the sequence of symbols. The at least one processor is further configured to estimate a reference noise contribution of at least one further symbol of the sequence of symbols. The at least one processor is configured to selectively consider, based on the noise contribution of the given synchronization symbol and based on the reference noise contribution of the at least one further symbol, the given synchronization symbol when determining a coupling coefficient of crosstalk between the first channel and a second channel.

According to an aspect, a method is provided. The method comprises receiving, on a first channel, a sequence of symbols. The method further comprises estimating a noise contribution of the given synchronization symbol of the sequence of symbols. The method further comprises estimating a reference noise contribution of at least one further symbol of the sequence of symbols. The method further comprises selectively considering, based on the noise contribution of the given synchronization symbol and based on the reference noise contribution of the at least one further symbol, the given synchronization symbol when determining a coupling coefficient of crosstalk between the first channel and a second channel.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

The foregoing and additional features and effects of the invention will become apparent from the following detailed description when read in conjunction with the accompanying drawings, in which like reference numerals refer to like elements.

DETAILED DESCRIPTION

Figure 1:
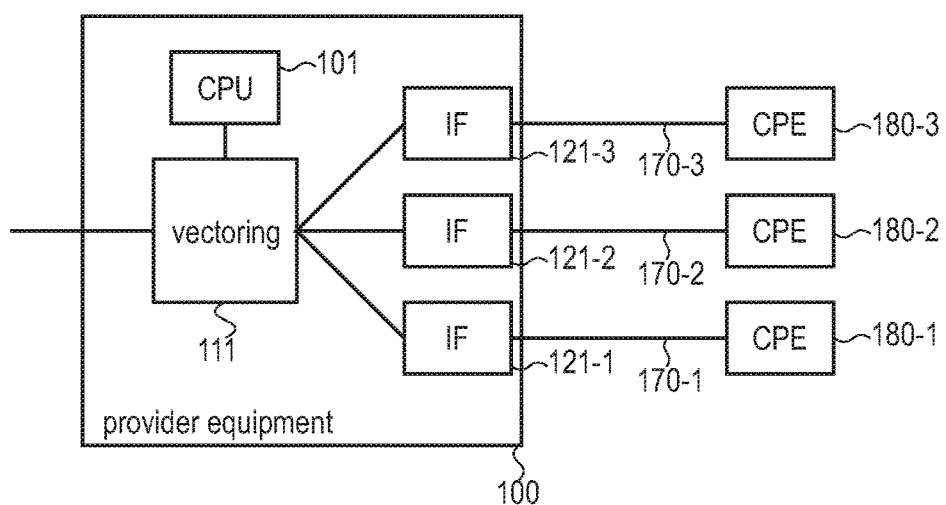
FIG. 1 illustrates a DSL communication system which can implement techniques according to various embodiments, the DSL communication system comprising provider equipment and a plurality of CPEs coupled with the provider equipment via respective channels corresponding to lines in a cable binder.

In the following, embodiments of the invention will be described in detail with refer-ence to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

A need exists for advanced techniques of determining a coupling coefficient of crosstalk between different channels. In particular, a need exists for advanced techniques of determining the coupling coefficient of a cancellation matrix used in vectoring techniques that mitigate FEXT in DSL technology. Further, a need exists for techniques that provide information on the reliability of reported parameters that are used for determining of the coupling coefficient, in particular of synchronization symbols.

Hereinafter, techniques will be described that allow determining a coupling coefficient of crosstalk between a first channel and the second channel at a comparably high accuracy. In particular, the determining of the coupling coefficient can be comparably reliable, i.e., it is possible that a given synchronization symbol on which said determining of the coupling coefficient is based are reliably detected as being disturbed or undisturbed. This may be expressed as a reliability value associated with the synchronization symbol. Such techniques enable the VP to selectively consider the synchronization symbols when determining coefficients of a cancellation matrix, e.g., of a vectored DSL communication system.

For example, if a first synchronization symbol is found to be undisturbed by non-FEXT noise, the VP can use the first synchronization symbol when determining the coupling coefficient. On the other hand, if a second synchronization symbol is found to be disturbed by non-FEXT noise, the VP can exclude the second synchronization symbol when determining the coupling coefficient. Typically, training sequences that include the synchronization symbols are periodic in time so that it is possible that after a certain period of time the information of the disturbed synchronization symbol can be derived from a further synchronization symbol transmitted at a later point in time. Such an approach may be particularly useful in downstream direction as that CPE does not have to transmit the sequence of symbols.

Advantageously, the techniques described herein do not require significant memory and/or computational power at the VP.

In various embodiments, the noise contribution of a given synchronization symbol is not evaluated based on the given synchronization symbol alone; rather, the noise contribution is set in relation to a reference noise contribution of at least one further symbol. Thereby, it is possible to obtain a reference value when determining whether a certain synchronization symbol is disturbed or undisturbed, the reference value being dependent on the sequence of symbols as well. The reference value is specific to a current noise environment of the system and may adapt—e.g., with some tailored latency—to changes in the noise environment. Therefore, instead of determining the noise contribution of the given synchronization symbol in an absolute manner, it is possible to relatively determine the noise contribution of the given synchronization symbol. This allows to achieve a higher reliability when estimating whether the given synchronization symbol is disturbed or not.

Thus, generally, it is possible to estimate the noise contribution of the given synchronization symbol of the sequence of symbols and further estimate the reference noise contribution of at least one further symbol of the sequence of symbols. Then, it is possible to selectively consider, based on the noise contribution of the given synchronization symbol and based on the reference noise contribution of the at least one further symbol, the given synchronization symbol when determining the coupling coefficient of crosstalk between the first channel and the second channel.

For example, the at least one further symbol can comprise a plurality of symbols that have been transmitted on the channel prior to the synchronization symbol and/or will be transmitted on the channel after the synchronization symbol. For example, it is possible that an average of error values of the plurality of symbols is determined, e.g., a moving average and/or a weighted average. By such techniques, it is ensured that sudden changes in the transmission environment on the channel are reflected in the reference value within due time, e.g., after a few synchronization symbol have been transmitted. Thus, as can be seen from the above, it is possible that the reference value is adapted with some latency; if the latency is longer than a typical timescale on which impulse noise occurs, it is possible to, on the one hand, reliably detect the impulse noise and, on the other hand, adapt to changes in the transmission environment. In particular, considering a typical duration of a symbol of 125 µs or 250 µs such as is the case in VDSL2 according to ITU-T Rec. G.993.2 or typically approximately 21 µs in G.fast, according to ITU-T Rec. G.9701, the likelihood of a single noise event influencing a large number of consecutive symbols—e.g., more than 10 or more than 50 symbols—is comparably small, yet the likelihood of a single noise event influencing one or a few consecutive symbols—e.g., less than 10 or less than 5—symbols s large; therefore, it may be advantageous to provide a reference value based on the at least one further symbol when determining the noise contribution of the given synchronization symbol that may be disturbed entirely. Preferably, a time difference between transmission of the given synchronization symbol and transmission of the at least some of the at least one further symbol is larger than an average duration of impulse noise expected to occur on the channel, e.g., larger than an equivalent of 10 or 50 symbols.

Turning now to the figures, in FIG. 1, a communication system according to an embodiment is shown. The system of FIG. 1 comprises a provider equipment 100 communicating with a plurality of CPE units 180-1-180-3. While three CPE units 180-1-180-3 are shown in FIG. 1, this serves merely as an example, and any number of CPE units 180-1-180-3 may be provided. Provider equipment 100 may be CO equipment, equipment in a distribution point (DP), or any other equipment used on a provider side. In case provider equipment 100 is part of a DP, it may, e.g., receive and send data from and to a network via a fiber optic connection. In other embodiments, other kinds of connections may be used.

In the embodiment of FIG. 1, the provider equipment 100 comprises a plurality of transceivers 121-1-121-3 to communicate with CPE units 180-1-180-3 via respective communication channels 170-1-170-3. Communication channels 170-1-170-3 may for example be implemented on copper lines, e.g., twisted pairs of copper lines. The lines as illustrated in FIG. 1 are all within a single cable binder and, therefore, FEXT between neighboring lines is significant. Communication via channels 170-1-170-3 may be based on a multicarrier modulation like discrete multitone modulation (DMT) and/or orthogonal frequency division multiplexing (OFDM), for example an xDSL communication like ADSL, VDSL, VDSL2, G.Fast etc., i.e. a communication where data is modulated on a plurality of carriers, also referred to as tones. A communication direction from provider equipment 100 to CPE units 180-1-180-3 is also referred to as downstream direction, and a communication direction from CPE units 180-1-180-3 to the provider equipment 100 is also referred to as upstream direction. Vectoring in the downstream direction is also referred to as crosstalk pre-compensation, whereas vectoring in the upstream direction is also referred to as crosstalk cancellation or equalization. Provider equipment 100 and/or CPE units 180-1-180-3 may include further communication circuits (not shown) conventionally employed in communication systems, for example circuitry for modulating, bit loading, Fourier transformation etc.

In some embodiments, the communication system may use vectoring to mitigate FEXT. Vectoring functionality is implemented by a VP 111 in FIG. 1. Vectoring comprises joint processing of signals to be sent and/or received to reduce FEXT.

If a new channel 170-1-170-3 joins the vectored group, the VP 111 calculates the coupling coefficients of crosstalk from the joining channel 170-1-170-3 to all active 170-1-170-3 channels and from the active channels 170-1-170-3 to the joining channel 170-1-170-3. If several channels 170-1-170-3 join in parallel, then in addition the coupling coefficients of crosstalk between the joining channels 170-1-170-3 are calculated. When all channels 170-1-170-3 are in Showtime, the VP 111 usually re-determines (updates) the coupling coefficients of crosstalk from time to time in order to track changes of the noise environment.

The coupling coefficients of crosstalk, sometimes also referred to as crosstalk canceller coefficients of the cancellation matrix, are usually calculated based on results from channel estimation or related parameters. According to the G.VECTOR and G.FAST standards, these parameters can be calculated during the synchronization symbols that have a small comparably constellation size, e.g., 4-Quadrature Amplitude Modulation (QAM). The transmitter typically modulates several or all tones of these synchronization symbols with a dedicated sequence; in this respect, according to the G.VECTOR standard the values −1 and +1 are employed in the dedicated sequence and, according to the G.FAST standard, the values −1, 0 and +1 are employed for modulation. The modulation sequence is either known by the receiver or the receiver estimates the transmitted sequence based on the received signal. In the G.VECTOR standard most of the tones of a synchronization symbols are modulated by a vendor-discretionary sequence. These tones are usually called probe tones. The remaining tones are called flag tones. These tones are applied to signal changes like bit-swaps, but are usually modulated with a constant sequence during channel estimation.

According to reference implementations, in downstream direction, the channel estimation is usually done based on decision errors that are reported by the CPE to the CO. In upstream direction, the channel estimation can be calculated based on decision errors and/or based on the received signal. According to reference implementations, in downstream direction, the CPE 180-1-180-3 usually provides information of the decision errors during the synchronization symbols to the VP 111; in upstream direction, the provider equipment 100, e.g., the CO, either provides information about the decision errors or the received symbols to the VP 111. This information can be used in determining the coupling coefficients of crosstalk.

In order to estimate the coupling coefficients of crosstalk, the VP 111 typically collects the reported parameters of all channels 170-1-170-3 over one period of the dedicated periodic training sequence of symbols in a matrix; this matrix is then multiplied by a further matrix that is formed by the inverse of the transmitted sequences. This calculation can be significantly simplified if the transmitted sequences are orthogonal as in this case the VP 111 can perform the core of the channel estimation algorithm by correlating the reported error values with the corresponding orthogonal sequence.

One disadvantage of this reference implementation as described above is that the results are comparably sensitive to disturbance, in particular to impulse noise hitting one or a few consecutive symbols of the sequence. This is illustrated by the following example: Assuming that a given channel 170-1-170-3 has negligible FEXT coupling to all other channels 170-1-170-3, e.g. because the corresponding line is wired in a separate cable binder, then the reported error values of the given channel 170-1-170-3 are expected to be comparably small. If one of the synchronization symbols employed for channel estimation is disturbed by a strong impulse noise event, then the corresponding error value will be quite high. Here, typically it may not be possible to determine which part of the error is generated by FEXT or background noise and which part is generated by an impulse noise event. Thus, due to the impulse noise event, the canceller coefficients of all disturbers to this given channel 170-1-170-3 will be nonzero, so that in this case the VP introduces artificial noise. As can be seen, in such a scenario it is difficult to discriminate between FEXT and impulse noise; this can cause errors when determining the coupling coefficients of crosstalk.

In order to alleviate this problem, hereinafter techniques are explained that enable the VP 111 to access information on the reliability of the reported parameters, in particular on the synchronization symbols (reliability value). Where synchronization symbols are found to be disturbed at a high accuracy (low accuracy), they can be selectively excluded (included) when determining the crosstalk coefficient of coupling.

Figure 2:
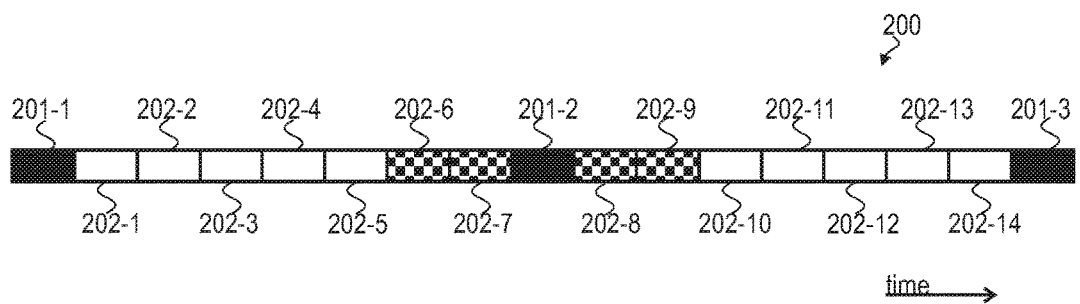
FIG. 2 illustrates a sequence of symbols transmitted via a first channel in uplink direction and comprising data symbols and synchronization symbols.

Data transmission via the communication channels 170-1-170-3 is illustrated at greater detail in FIG. 2. In some embodiments, communication via communication channels 170-1-170-3 is a frame-based communication. A plurality of frames may form a superframe (frames and superframes not shown in FIG. 2). In FIG. 2, a sequence 200 of symbols 201-1-201-3, 202-1-202-14 is illustrated. The sequence 200 comprises data symbols 202-1-202-14 and synchronization symbol 201-1-201-3. The density of synchronization symbols 201-1-201-3 in the sequence 200 can vary. E.g., it is possible that in between consecutive synchronization symbols 201-1-201-3, there are 256 data symbols 202-1-202-14. Typically, the data symbols 202-1-202-14 are protected by a Viterbi decoder that decodes a Trellis code. Generally, it is not required that also the synchronization symbols 201-1-201-3 are protected by a Viterbi code, e.g., by encoding based on a Trellis code. The synchronization symbols 201-1-201-3 carry information that allows to determine the coupling coefficient of crosstalk between the respective channel 170-1-170-3 and further channels 170-1-170-3 of lines in the cable binder. The data symbols 202-1-202-14 carry payload data.

As mentioned above, the duration of any one of the symbols 201-1-201-3, 202-1-202-14 can vary, e.g., between 20 µs and 250 µs depending on the communication technology employed.

Hereinafter, various embodiments will be described with respect to the given synchronization symbol 201-2. The given synchronization symbol 201-2 is selectively considered when determining the coupling coefficient. Whether or not the given synchronization symbol 201-2 is considered may be determined (i) based on the noise contribution of the given synchronization symbol 201-2 and (ii) based on the reference noise contribution of a plurality of adjacent data symbols 202-1-202-14 and/or adjacent synchronization symbols 201-1, 201-3. The reference noise contribution thus serves as a reference value. E.g., Whether or not the given synchronization symbol 201-2 is considered may depend on a respective reliability value which may be implicitly or explicitly determined.

The plurality of data symbols 202-1-202-14 being adjacent to the given synchronization symbol 201-2 can refer to: the plurality of data symbols 202-1-202-14 being arranged in the vicinity within the sequence 200 of the given synchronization symbol 201-2. I.e., it is possible that the plurality of data symbols 202-1-202-14 are arranged in between the given synchronization symbol 201-2 and the two next-neighbor synchronization symbols 201-1, 202-3 before and after the given synchronization symbol 201-2.

Figure 3:
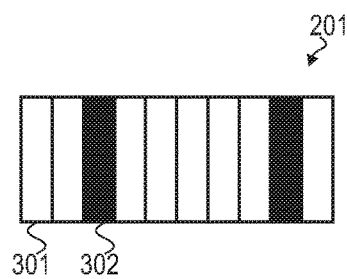
FIG. 3 illustrates a synchronization symbol comprising a plurality of tones.

According to various embodiments, the noise contribution of the given synchronization symbol 201-2 is determined based on a decision error of at least one tone 301, 302 of the given synchronization symbol 201-2 (see FIG. 3). E.g., the at least one tone 301, 302 can be a flag tone 302. Typically, the flag tones 302 are identically modulated during each synchronization symbol 201-1-201-3. This allows determining the decision error of the synchronization symbol 201-1-201-3 at a high accuracy. Generally, a higher accuracy may be achieved if a larger number N of tones 301, 302 is considered when estimating the noise contribution of the given synchronization symbol 201-2.

Generally, the probe tones 301 are modulated by the transmitter with a channel-dependent sequence. Because of this, error values of a single probe tone 301 can show a significant time dependence: In a scenario where FEXT is the dominant noise source, noise on the probe tones 301 consists mainly of the sum of the FEXT of several disturbers; as these disturbers modulate the transmitted synchronization symbols 201-1, 201-2, 201-3 with a channel-specific sequence, the sum of these individual noise contributions can vary significantly from synchronization symbol 201-1, 201-2, 201-3 to synchronization symbol 201-1, 201-2, 201-3. As mentioned above, it is advantageous to consider flag tones 301, 302 when determining the noise contribution. This is because in such a scenario the difference between noise contributions of several synchronization symbols 201-1-201-3 predominantly depends on external non-FEXT noise. This is under the assumption that the crosstalk environment remains unchanged, i.e., that no channels are joining and leaving and the corresponding coupling coefficient of crosstalk remain unchanged between transmission of the above-mentioned several synchronization symbols 201-1-201-3.

Scenarios are conceivable where also the flag tones 302 are modulated. E.g., flag tones 302 can be modulated in order to indicate a reconfiguration procedure. Then, typically all flag tones 302 of the given synchronization symbol 201-1-201-3 are sign-inverted simultaneously by the corresponding transmitter. Therefore, it may be desirable to disable reconfiguration of the channel 170-1-170-3 while the VP 111 performs a channel estimation employing techniques as explained herein.

In this scenario, the noise contribution X1(k) to the given synchronization symbol 201-2 can be expressed as:

$$X1(k) = \sum_{j=1}^{N} |e(j)|^2, \qquad (1)$$

where index j runs over considered tones 301, 302 of the given synchronization symbol 201-2 and e(j) denotes the decision error of tone j, 301, 302. Optionally, X1(k) may be normalized to N or in another way. Instead of the absolute value of eq. (1), other functions such as the squared absolute value, etc. can be taken into account.

Generally, it is possible that the noise contribution of the given synchronization symbol 201-2 is not determined solely based on the given synchronization symbol 201-2, e.g., based on tones 301, 302 of the given synchronization symbol 201-2 as explained above. E.g., alternatively or additionally to such an approach, it is possible to take into consideration data symbols 202-1-202-14 adjacent to the given synchronization symbol 201-2 when determining the noise contribution to the given synchronization symbol 201-2. In the scenario of FIG. 2, it is assumed that for estimating the noise contribution to the given synchronization symbol 201-2, properties of the adjacent data symbols 202-6-202-9 (illustrated in FIG. 2 by the checkerboard pattern) are taken into account. Here, next-neighbor data symbols 202-6-202-9 are considered; it is also possible to consider more remote data symbols 202-1-202-14. In any case, it is possible that the noise contribution to the given synchronization symbol 201-2 is estimated based on a decoding reliability of the Viterbi decoder decoding the Trellis code with which the data symbols 202-6-202-9 have been encoded. This may involve, e.g., comparison of a decoding metric corresponding to a decoding path of highest reliability and a further decoding path of second highest reliability; larger (smaller) differences in between the two metrics may correspond to a smaller (larger) reliability. See, e.g., H. K. Sim and D. G. M. Cruickshank, "A sub-optimum MLSE detector with a folded state-transition trellis preselection stage" in 3G Mobile Comm. Tech. (2000) 271-275.

In FIG. 2, the data symbols 202-6-202-9 that are taken into account when determining the noise contribution to the given synchronization symbol 201-2 are immediately preceding and succeeding the given synchronization symbol 201-2 in the sequence 200. This ensures that impulse noise that hits the corresponding part of the sequence 200 affects, both, the given synchronization symbol 201-2, as well as the adjacent data symbols 202-6-202-9 taken into account when estimating the noise contribution of the given synchronization symbol 202-2.

Generally, the number of adjacent data symbols 202-1-202-14 that is taken into account when determining the noise contribution to the given synchronization symbol 201-2 may vary; preferably, a number of data symbols 202-1-202-14 that is taken into account corresponds to a time duration on which impulse noise is typically occurring. Impulse noise may typically occur on a time scale between 0.5 ms and 10 ms or even longer durations. Correspondingly, it is possible to take into account between 1-100 adjacent data symbols, preferably between 1-8 adjacent data symbols, more preferably between 2-4 adjacent data symbols.

Considering that the decision error of a Viterbi decoder decoding symbol k is denoted V(k): The noise contribution X2(k) to the given synchronization symbol 201-2 can be expressed as $$X2(k) = \sum_{i=k-2}^{i=k+2} V(k) \qquad (2)$$

where index i runs over data symbols in the sequence, k consecutively indexes all symbols 201-1-201-3, 202-1-202-14 of the sequence 200, and V(k) denotes the Viterbi decoding reliability of data symbol k (Viterbi metric).

Employing the Viterbi reliability has the advantage that the Viterbi metric can be determined during each data symbol 201-1-202-14 comparably quick and without the need of extensive computational efforts. Further, the Viterbi metric is typically not influenced by early training states of joining channels 170-1-170-3, as during such early training states the joining channel 170-1-170-3 is typically only transmitting synchronization symbols and muted during transmission of the data symbols 201-1-202-14.

Figure 4:
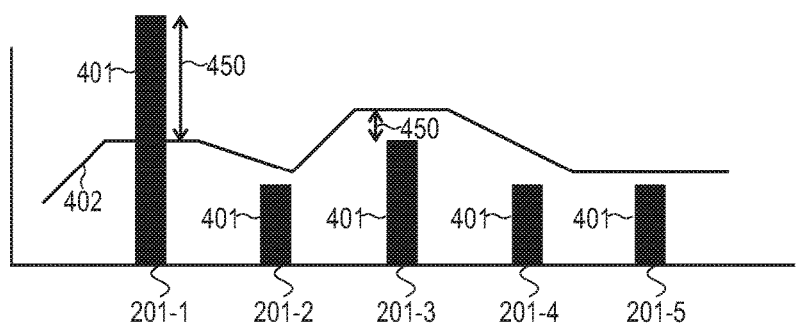
FIG. 4 illustrates a noise contribution of the given synchronization symbol of the sequence of symbols in relation to a reference noise contribution of at least one further symbol of the sequence of symbols.

Above, two scenarios of estimating the noise contribution 401 of the given synchronization symbol 201-2 has been shown (cf. FIG. 4). According to various embodiments, the noise contribution 401 is set into relation with the reference noise contribution 402 of one or more further symbols 201-1, 201-3, 202-1-202-14. By this, a relative baseline when determining a reliability value for the given synchronization symbol 201-2 can be provided making the techniques more robust against drifts or changes in the transmission environment or noise background.

Hereinafter, techniques will be explained that allow to provide said relative baseline, i.e., allow to establish the reference noise contribution 402 of the one or more further symbols 201-1, 201-3, 202-1-202-14.

Generally, it is preferable that the one or more further symbols 201-1, 201-3, 202-1-202-14 are adjacent to the given synchronization symbol 201-2 in the sequence 200; thereby, it is ensured that an up-to-date reference value is considered when estimating the reliability value for the given synchronization symbol 201-2. It is not required that the one or more further symbols 201-1, 201-3, 202-1-202-14 are next-neighbours of the given synchronization symbol 201-2.

Further, depending on the particular metric with which the noise contribution 401 of the given synchronization symbol 201-2 is established, it may be required to correspondingly establish the reference noise contribution 402 of the at least one further symbol 201-1, 201-3, 202-1-202-14.

E.g., if the noise contribution 401 of the given synchronization symbol 201-2 is established based on the decision error of tones 301, 302 of the given synchronization symbol 201-2, it is possible that the reference noise contribution 402 is also established based on decision errors of tones 301, 302 of at least one further synchronization symbol 201-1, 201-3 consecutive to the given synchronization symbol 201-2 in the sequence 200, i.e., at least one of the two the next-neighbour synchronization symbols 201 of the sequence 200 where only data symbols 202-1-201-14 are in-between. Preferably, a plurality of further synchronization symbols 201-1, 201-3 consecutive to the given synchronization symbol 201-2 in the sequence 200 is considered.

Considering Eq. 1, the reference noise contribution 402 of the at least one further synchronization symbol X1ref can be determined as follows:

$$X1_{ref}(k) = aX1_{ref}(k-1) + (1-a)X1(k), \qquad (3)$$

where k denotes a synchronization symbol 201-1, 201-3, e.g., the next-neighbour synchronization symbol 201-1 preceding the given synchronization symbol 201-2, and a is a parameter between 0 and 1. Equation 3 corresponds to a moving average. However, it should be understood that instead of the moving average according to the Eq. 3, different kinds of averages can be considered in determining X1ref. For example, it would be possible to take into account a larger number of consecutive synchronization symbols 201-1, 201-3, i.e., second-next neighbours etc.

A reliability value Y1 can then be obtained by considering the deviation 450 between the reference noise contribution 402 of the at least one further synchronization symbol and the noise contribution 401 of the given synchronization symbol 201-2, i.e., by $$Y1(k) = X1(k) - X1_{ref}(k-1). \qquad (4a)$$

Alternatively or additionally, Y1(k) may also be determined by $$Y1(k)=X1(k)-X1_{ref}(k). \quad (4b)$$

When judging whether the given synchronization symbol 201-1 should be considered when determining the coupling coefficient of crosstalk, it is possible that the reliability value Y1 is compared against a predefined threshold in a threshold comparison and that the outcome of the threshold comparison determines whether the given synchronization symbol 201-2 is considered.

As can be seen from the above, it is possible that the reliability value is determined based on the given synchronization symbol 201-2 and one or more further synchronization symbols 201-1, 201-3, only. However, as explained above with respect to Eq. 2, it is also possible to take into account adjacent data symbols 202-6-202-9 when determining the noise contribution 401 of the given synchronization symbol 201-2; likewise, it is also possible to take into account data symbols 202-1-202-14 that are arranged adjacent to the given synchronization symbol 201-2 in the sequence 200 when determining the reference noise contribution 402 of the at least one further symbol 201-1, 201-3, 202-1-202-14. Generally, it is possible that a number of adjacent data symbols 202-6-202-9 taken into account when determining the noise contribution 401 of the given synchronization symbol 201-2 is smaller than a number of adjacent data symbols 202-1-201-14 taken into account when determining the reference noise contribution 402 of the plurality of further data symbols 202-1-201-14.

With respect to the Eq. 3, the following case is considered: during transmission of the sequence 200, new channels 170-1-170-3 join. Because of this, the received FEXT suddenly changes. E.g., the FEXT can suddenly increase. Because the reference noise contribution 402 is determined based on an average, it follows the now changed FEXT environment with some latency. Then, it is likely that a small number of synchronization symbols 201-1-201-3 are marked as unreliable and not considered when determining the coupling coefficient of crosstalk. By adjusting parameter a of the Eq. 3, it is possible that the mentioned latency is adjusted according to ones needs.

For example, when determining the reference noise contribution 402, a comparably large number of adjacent data symbols 201-1-202-14 can be taken into account. E.g., it is possible to take into account between 1 and 300 data symbols, preferably 100-256 data symbols, more preferably all data symbols that are arranged in between the given synchronization symbol 201-2 and the next-neighbour synchronization symbol 201-1 preceding the given synchronization symbol 201-2 in the sequence 200. Alternatively or additionally, it is also possible that all next-neighbour data symbols 202-8-202-14 succeeding the given synchronization symbol 201-2 in the sequence 200 are taken into account when determining the reference noise contribution 402. Then, it is possible that the reference noise contribution 402 of the plurality of data symbols 202-1-202-14 is determined based on an average of noise contributions of the plurality of data symbols 202-1-202-14.

E.g., in mathematical terms, the reference noise contribution 402 of the plurality of data symbols 202-1-202-14 with respect to the given synchronization symbol 201-2 can be expressed as $$X2_{ref}(k) = \frac{1}{N+M} \sum_{i=k-N}^{k+M} V(i), \quad (5)$$

where preferably N=256, M=0, i runs over all data symbols 202-1-202-14 in the sequence 200, and k denotes the position of the given synchronization symbol 201-2.

Alternatively or additionally to the approach of Eq. 5, it is also possible to consider a moving average.

A reliability value Y2 can then be obtained by considering the deviation 450 between the reference noise contribution 402 of the at least one further synchronization symbol and the noise contribution 401 of the given synchronization symbol 201-2, i.e., by $$Y2(k)=X2(k)-X2_{ref}(k). \quad (6)$$

When judging whether the given synchronization symbol 201-1 should be considered when determining the coupling coefficient of crosstalk, it is possible that the reliability value Y2 is compared against a predefined threshold in a threshold comparison.

Generally, Y1(k) and Y2(k) can be used separately or in combination, e.g., by a weighted average or the like, e.g., by $$W=bY1(k)+cY2(k), \quad (7)$$

where W is the final reliability value and b, c are some parameters. Where Y1(k) and Y2(k) are used in combination, e.g., as defined by Eq. 7, it may be preferable to base the calculation of Y1(k) and Y2(k) on at least partly different symbols 201-1-201-3, 202-1-201-4; in this regard, it may be possible to exclude the data symbols 202-6-202-9 considered when determining the noise contribution 401 of the given synchronization symbol when determining the reference noise contribution 402—and/or vice versa. In practice, this may correspond to exclude from the sum in Eq. 5 those values of i that designate data symbols 202-1-202-14 that have already been considered in Eq. 2 by the respective index i.

Hence, generally, it is possible that a first reference noise contribution 402 of the at least one further symbol 201-1, 201-3, 202-1-202-14 and a first noise contribution 401 of the given synchronization symbol 201-2 is estimated based on the decoding reliability of the Viterbi decoder and that, further, a second reference noise contribution 402 of the at least one further symbol 201-1, 201-3, 202-1-202-14 and the second noise contribution 401 of the given synchronization symbol 201-1 is estimated based on the error value of the at least one tone 301, 302 of the respective symbol.

Thus, in various embodiments it is possible that the when judging whether the given synchronization symbol 201-2 should be considered a weighted sum of two criteria, i.e., the Viterbi reliability and the absolute decision error, is considered. This allows to more accurately estimate the noise contribution to the given synchronization symbol by further taking into account adjacent symbol in the sequence of symbols.

Figure 5:
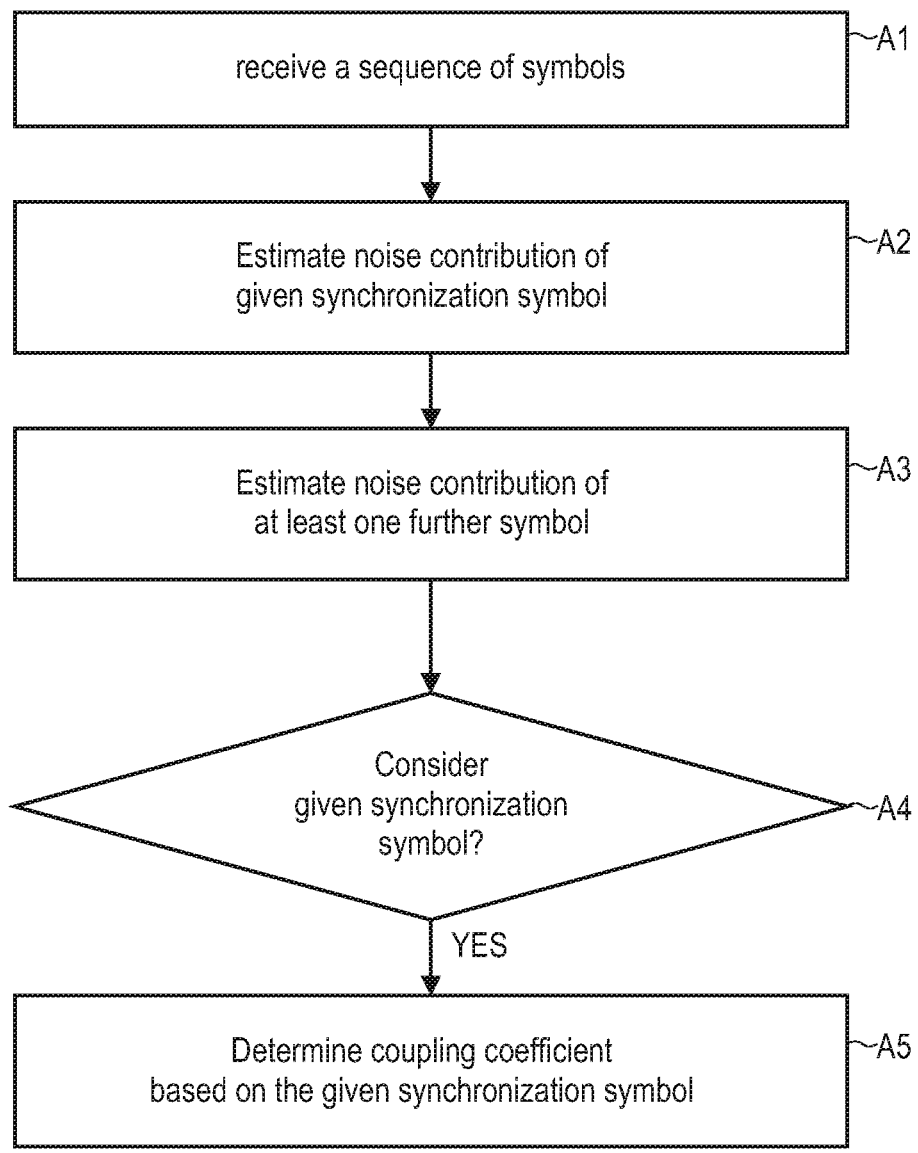
FIG. 5 is a flowchart illustrating a method according to various embodiments.

In FIG. 5 is a flowchart of a method according to various embodiments.

At A1, the sequence 200 of symbols 201-1-201-3, 202-1-202-14 is received, e.g., by the provider equipment 100 such as the CO via a given channel 170-1-170-3.

At A2, the noise contribution 401 of the given synchronization symbol 201-2 is estimated. This may be done based on the synchronization symbol 201-2 alone, e.g., based on absolute error values of flag tones 302; alternatively or additionally, this may be done based on adjacent data symbols 202-6-202-9. E.g., between 2 and 10 data symbols 202-6-202-9 may be taken into account. Here, a reliability information from a Viterbi decoder decoding the Trellis-code protected data symbols 202-6-202-9 may be used as a metric to determine the noise contribution 401.

The noise contribution 401 of the given synchronization symbol 201-2 is set into correlation with a reference value, i.e., the reference noise contribution 402 of at least one further symbol. In some embodiments, the reference noise contribution 402 may be estimated based on the next-neighbour preceding synchronization symbol 201-1, only. A larger number of synchronization symbols 201-1, 201-3 may be taken into account. Again, absolute error values of flag tones 302 may be used. It is also possible to consider a plurality of data symbols 202-1-202-14, e.g., all data symbols 202-1-202-7 between the preceding next-neighbour synchronization symbol 201-1 and the given synchronization symbol 201-2; here, the decoding reliability of a Viterbi decoder may be considered.

At A4, it is determined whether the given synchronization symbol 201-2 should be considered when determining/updating the channel matrix. E.g., the deviation 450 between the noise contribution 401 of A2 and the noise contribution 402 of A3 may be determined; if the absolute value of the deviation is larger (smaller) than a predefined threshold, the given synchronization symbol 201-2 may not be (may be) considered when determining the coupling coefficient at A5.

If error values of the given synchronization 201-2 are not considered when determining/updating the channel matrix, it can be necessary to wait for the corresponding error value in a next iteration of the sequence 200. This can increase training time; however, an accuracy of the training is increased.

Summarizing, above techniques have been illustrated that allow accurately to determine a reliability value for synchronization symbols. This enables to selectively consider the synchronization symbol when determining the coupling coefficient of crosstalk. The present techniques allow establishing well-defined criteria as to when a certain synchronization symbol is considered unreliable. Further, the present techniques may be employed under full control of the provider equipment which enables to accurately estimate the reliability at a high accuracy. Control signalling is reduced. Further, there is no need for additional training time as the techniques may operate on legacy training sequences. Memory requirements to implement such techniques are low.

Advantages of various embodiments become apparent when considering a case according to reference implementations where the reliability bit is determined by the CPE. Here, first, it may be difficult for the CPE to determine the reliability bit accurately and in a meaningful way. E.g., if several tones are continuously disturbed by an radio frequency interference disturber at the CPE-side, then the error calculated on these tones be design cannot be accurate and reliable by nature; this may result in a scenario where all error vectors might be marked as unreliable even though they may well be used for determining the crosstalk coefficient of coupling. Another problem might occur if a new channel joins the vectored group. In this case a receiver which is part of the vectored group might immediately be subjected to higher error amplitudes during synchronization symbols when the new channel is training up due to the new FEXT environment. Therefore, also in this case all error values might be marked as unreliable even though they may well be used for determining the crosstalk coefficient of coupling. As illustrated by such examples, the reliability bit according to reference implementations may have limited value if compared against the techniques as presented above.

E.g., if compared to techniques as presented in US 2012/0106605 A1 various embodiments offer further advantages. According to US 2012/0106605 A1, orthogonal sequences having a length larger than the number of active channels plus joining channels is employed. Here, the VP can get additional information about the noise environment by correlating the reported error values with sequences that are orthogonal to the ones applied by the active transmitters. In this way, the VP can estimate the reported error values that have been disturbed by impulse noise disturbers. One disadvantage of such techniques is that it relies solely on the reported error values and assumes that all calculations done by the CPE are correct even if an impulse noise occurred. Furthermore such techniques require significant additional memory at the VP that is used to hold the correlation sums that have to be calculated in addition. The required memory further increases significantly if impulse noise shall be subtracted from the received error reports. Another disadvantage is that the applied orthogonal sequences are prolonged in any case, so that the initial training time increases.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

What is claimed is:

1. A device, comprising:
at least one processor configured to receive a sequence of symbols associated with a first channel, and estimate a noise contribution of a given synchronization symbol of the sequence of symbols, and further estimate a reference noise contribution of at least one further symbol of the sequence of symbols,
wherein the at least one processor is configured to selectively consider, based on the noise contribution of the given synchronization symbol and based on the reference noise contribution of the at least one further symbol, the given synchronization symbol when determining a coupling coefficient of crosstalk between the first channel and a second channel.

2. The device of claim 1, wherein the at least one processor is configured to estimate the noise contribution of the given synchronization symbol based on a plurality of data symbols adjacent to the given synchronization symbol in the sequence of symbols.

3. The device of claim 2, wherein at least one data symbol of the plurality of data symbols is succeeding the given synchronization symbol in the sequence of symbols.

4. The device of claim 2, wherein the plurality of data symbols comprises 2-4 data symbols.

5. The device of claim 1, wherein the at least one further symbol comprises at least one further synchronization symbol consecutive to the given synchronization symbol in the sequence of symbols.

6. The device of claim 1, wherein the at least one further symbol comprises a plurality of data symbols arranged adjacent to the given synchronization symbol in the sequence of symbols.

7. The device of claim 6, wherein the at least one processor is configured to determine the reference noise contribution of the at least one further symbol based on an average of noise contributions of the plurality of data symbols.

8. The device of claim 1, wherein the at least one processor is configured to estimate at least one of the reference noise contribution of the at least one further symbol and the noise contribution of the given synchronization symbol based on a decoding reliability of a Viterbi decoder by comparing a decoding metric corresponding to a decoding path of a highest reliability and a decoding metric corresponding to a further decoding path of a second highest reliability, wherein a size of a difference between the two decoding metrics corresponds to the decoding reliability.

9. The device of claim 1, wherein the at least one processor is configured to estimate at least one of the reference noise contribution of the at least one further symbol and the noise contribution of the given synchronization symbol based on an error value of at least one tone of the respective symbol.

10. The device of claim 9, wherein the at least one processor is configured to estimate the noise contribution of the given synchronization symbol based on the error value of at least one flag tone of the given synchronization symbol.

11. The device of claim 1, wherein the at least one processor is configured to estimate a first reference noise contribution of the at least one further symbol and a first noise contribution of the given synchronization symbol based on a decoding reliability of a Viterbi decoder by comparing a decoding metric corresponding to a decoding path of a highest reliability and a decoding metric corresponding to a further decoding path of a second highest reliability, wherein a size of a difference between the two decoding metrics corresponds to the decoding reliability, and wherein the at least one processor is configured to estimate a second reference noise contribution of the at least one further symbol and a second noise contribution of the given synchronization symbol based on an error value of the at least one one of the respective symbol.

12. The device of claim 1, wherein the at least one processor is configured to determine a deviation of the noise contribution of the given synchronization symbol and the reference noise contribution of the at least one further symbol, wherein the at least one processor is configured to execute a threshold comparison between the deviation and a predefined threshold, wherein the at least one processor is configured to selectively consider the given synchronization symbol when determining the coupling coefficient based on the executed threshold comparison.

13. The device of claim 1, wherein the at least one processor is further configured to cancel far-end crosstalk on the first channel based on the determined coupling coefficient of crosstalk in a vectored Digital Subscriber Line system during Showtime.

14. A method, comprising:
receiving a sequence of symbols associated with a first channel at a processor,
estimating a noise contribution of a given synchronization symbol of the sequence of symbols and further estimate a reference noise contribution of at least one further symbol of the sequence of symbols using the processor, and
selectively considering, based on the noise contribution of the given synchronization symbol and based on the reference noise contribution of the at least one further symbol, the given synchronization symbol when determining a coupling coefficient of crosstalk between the first channel and a second channel using the processor.

15. The method of claim 14, wherein the noise contribution of the given synchronization symbol is estimated based on a plurality of data symbols adjacent to the given synchronization symbol in the sequence of symbols.

16. The method of claim 14, wherein the at least one further symbol comprises at least one further synchronization symbol consecutive to the given synchronization symbol in the sequence of symbols.

17. The method of claim 14, wherein the at least one further symbol comprises a plurality of data symbols arranged adjacent to the given synchronization symbol in the sequence of symbols.

18. The method of claim 14, wherein at least one of the reference noise contribution of the at least one further symbol and the noise contribution of the given synchronization symbol is estimated based on a decoding reliability of a Viterbi decoder by comparing a decoding metric corresponding to a decoding path of a highest reliability and a decoding metric corresponding to a further decoding path of a second highest reliability, wherein a size of a difference between the two decoding metrics corresponds to the decoding reliability.

19. The method of claim 14, wherein at least one of the reference noise contribution of the at least one further symbol and the noise contribution of the given synchronization symbol is estimated based on an error value of at least one tone of the respective symbol.

20. The method of claim 14, further comprising:
determining a deviation of the noise contribution of the given synchronization symbol and the reference noise contribution of the at least one further symbol, and
executing a threshold comparison between the deviation and a predefined threshold,
wherein said selectively considering of the given synchronization symbol when determining the coupling coefficient is based on the executed threshold comparison.

* * * * *